United States Patent

[11] 3,593,432

[72] Inventor Michael L. Reynolds.
 8304 E. 110th Terrace, Kansas City, Mo. 64134
[21] Appl. No. 874,871
[22] Filed Nov. 7, 1969
[45] Patented July 20, 1971

[54] TEACHING AID FOR COACHING SPORTS AND MANUAL SKILLS
 5 Claims, 3 Drawing Figs.
[52] U.S. Cl. ................................................ 35/29 R, 352/99
[51] Int. Cl. ................................................ G03b 25/00
[50] Field of Search ...................................... 35/29; 352/99

[56] References Cited
UNITED STATES PATENTS
1,787,592 1/1931 Owens .......................... 352/99

Primary Examiner—Skogquist, Harland S.
Attorney—Jones & Lockwood

ABSTRACT: A teaching aid comprising transparencies is disclosed for coaching sport and other manual skills requiring coordination, in time, of various parts of the body. Transparencies showing various incremental movements of a complicated action in a play or the like are arranged to be flipped for sequential rapid viewing to indicate movements of a right-handed or a left-handed professional player as a teaching aid. Transparencies are generally secured at one edge as by a gripper to provide a booklet form.

PATENTED JUL 20 1971  3,593,432

INVENTOR
MICHAEL L. REYNOLDS
BY Beale and Jones
ATTORNEYS

TEACHING AID FOR COACHING SPORTS AND MANUAL SKILLS

FIELD OF THE INVENTION

The present invention relates, in general, to an aid for teaching sports and the like where coordination, in time and position, of various parts of the player's body is required and, more particularly, to a booklet adapted for use in coaching baseball or other sports activities.

DESCRIPTION OF THE PRIOR ART

It is well known that for a person who is learning to coordinate, in time and position, various parts of his body, the best way to accomplish this is to compare his own movements with the corresponding movements of an expert in the field in order to get a feeling for the correct posture. Various methods have been suggested to achieve this. For example, a mirror arrangement for the player to see his own movements in cooperation with the photographs of an expert for comparison has been used. Another way is to compare the motion pictures of a play run at a very slow speed to analyze the movements. However, these methods are not very practical when the players are improving their skills while practicing in the field because of extra equipment needed. The idea of picking out certain frames of a motion picture showing the movements of a player and the corresponding frames of another motion picture of an expert and making the photographic prints therefrom has also been tried. The prints are arranged in juxtaposition for comparison. But it is impossible to use prints showing movements of an expert left-handed player for a right-handed player or vice versa. Further, the expense involved in making the necessary motion pictures is beyond the means of most individuals and teams, and thus this is not a practical solution to the teaching problem.

SUMMARY OF THE INVENTION

The object of the present invention is to overcome the foregoing problems existing with the conventional methods. Transparencies are made from selected frames of a motion picture of an expert showing exemplary movements. The transparencies are put together in a gripper so as to make a booklet. No additional equipment is required to view the transparencies, and they are so arranged that either a left-handed player or a right-handed player can use the same booklet by viewing from one side or the other and flipping them. Opaque sheets of light color placed between adjacent transparencies allow the viewer to see one picture at a time. Consequently, this invention achieves the objectives of eliminating the need of cumbersome equipment for comparison of a player's own movements with those of an expert and makes it possible for use by either a left-handed player or a right-handed player. The revision of the booklet to incorporate some new desirable movements is also easier than deemed possible in the prior art.

BRIEF DESCRIPTION OF THE DRAWING

The novel features of the invention are set forth with particularity in the appended claims, but the invention will be understood more clearly and fully from a detailed description of a preferred embodiment of the invention, as set forth in the accompanying drawings, in which:

DESCRIPTION OF A PREFERRED EMBODIMENT

Figure 1:
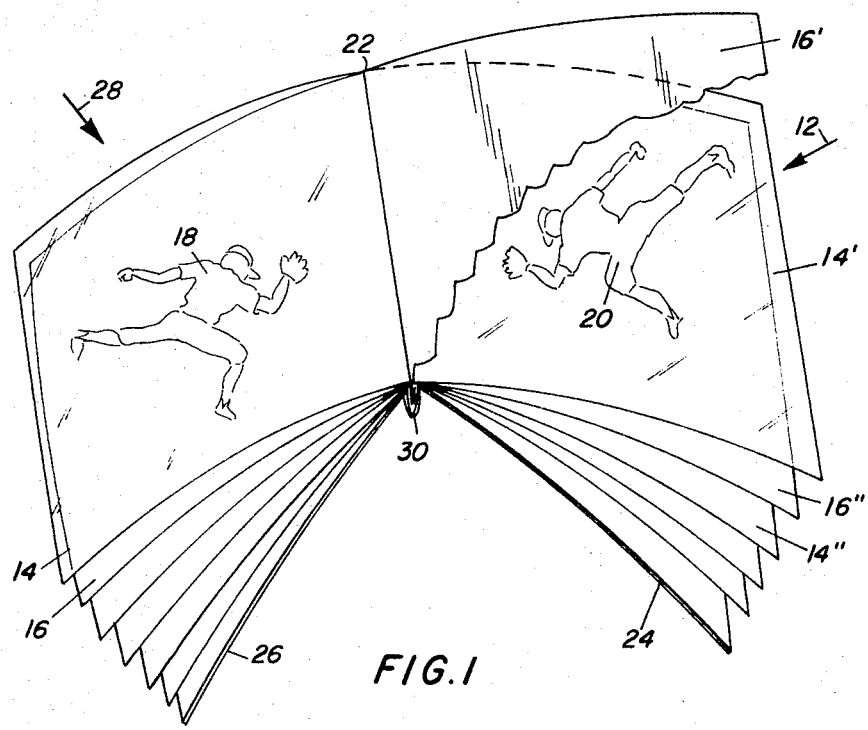
FIG. 1 is a perspective view of a booklet in accordance with the present invention.

Referring now to the perspective view of FIG. 1, the numeral 12 generally indicates a teaching aid booklet constructed in accordance with the present invention. As shown, the booklet 12 consists of a number of transparencies 14 and sheets of opaque paper 16 of light color, preferably white, interposed between the transparencies. The transparencies are made of transparent plastic sheets, or the like, of an appropriate size, preferably about 4¼ inches by 2¾ inches, with reproductions 18, 20, etc. of 16mm. or other suitable frames, depicting various incremental movements, affixed or printed thereon. All the transparencies and the interposed sheets of white paper may be glued or otherwise secured together so as to form edge 22 of the booklet. The booklet preferably is provided with a front cover 24 and a back cover 26.

The illustrated embodiment shows successive movements 18, 20, of a figure throwing a ball, and may be illustrative of a baseball pitcher. Any transparency in the booklet can be viewed with the front cover at the top and the back cover at the bottom, or vice versa. If the front cover is at the top and the back cover at the bottom and the booklet is viewed in the direction of arrow 28, flipping the transparencies sequentially down onto the back cover will provide, in the illustrated embodiment, successive increments of the throwing motion of a left-handed player. Reproduction 18 on sheet 14 will be viewed first, with sheet 16 forming a background; reproduction 20 will then be flipped down on top of intermediate sheet 16' which will cover sheet 14. Subsequently, opaque sheet 16'' will be flipped down to cover transparency 14', and sheet 14'' will be viewed. It will be recognized that by flipping the booklet pages rapidly, an appearance of motion will result, while the booklet can also be used to show for detailed study still pictures of portions of the complete motion.

As has been indicated, the same transparencies can be used in illustrating the motions of a right-handed pitcher, merely by viewing them in the same order (e.g., sheets 14, 14', 14'', etc.) but from the opposite side of each sheet. This may be accomplished by turning the booklet over, so that the front cover 24 is on the bottom and the back cover 26 is on the top. The transparencies may then be viewed in sequence by turning them upwardly toward the back cover. In this case, however, different opaque sheets form the background for each transparency; i.e., transparency 14 will be backed by sheet 16', transparency 14' will be backed by sheet 16'', and so on.

Figure 2:
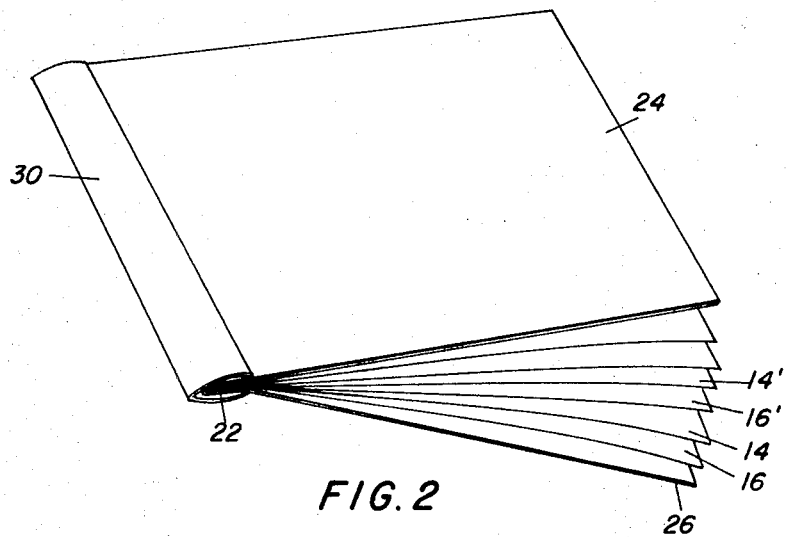
FIG. 2 is a front view of the booklet which is partly opened to show various transparencies.

End 22, where all the transparencies and the sheets of white paper separating them are secured together, may be inserted into a resilient plastic gripper 30, as illustrated in FIG. 2. The gripper, or other suitable holder, serves to hold the booklet together, and may be used to secure covers 24 and 26 to the booklet.

The relative positions of two adjoining transparencies 14 and 14' and the interposed sheet of white paper 16' are illustrated in FIGS. 1 and 2. The sheet of paper of light color, preferably white, is used to provide a good background for either of the two transparencies and it also eliminates the imprints of other transparencies interfering with the process of viewing a particular transparency.

Figure 3:
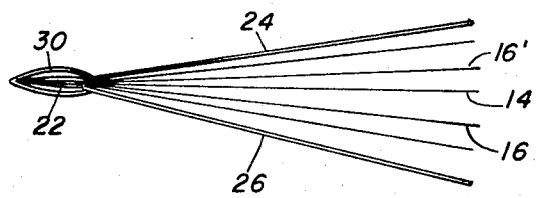
FIG. 3 is an end view of the booklet, providing an additional illustration of the relationship between the transparencies and the adjacent opaque sheets.

The flexibility with which any of the transparencies can be viewed from various positions is further illustrated in FIG. 3. The sheets of white paper 16, 16', etc. will provide proper background for viewing the transparencies 14, 14', etc. from either front or back.

As has been described, the present invention provides an extremely versatile and flexible coaching tool by providing a booklet which may be used in comparing movements of a player with the corresponding movements of an expert without requiring any special equipment. Further, the invention allows a left-handed player or a right-handed player to use the same booklet and the same transparencies, thus giving both players the benefit of expert teaching. Because of its size, such a booklet can be taken directly to the coaching field by the instructor to give individual instruction to the players at the time they are practicing, rather than delaying instruction in proper form and motion to some later time. The size of the booklet also facilitates filing for future use and the plastic sheets comprising the transparencies will not deteriorate easily. The transparencies can be marked with grease pencils of different colors to stress a point, after which the marks can be washed off without damaging the transparencies in any way. The booklet can be revised easily by adding new transparencies to show new incremental movements in a complicated play.

Having described fully a preferred embodiment of the present invention, it will be understood that many variations are possible to those skilled in the art, and the invention in its broader aspect, is not limited to the particular embodiment shown and described. For example, the size of the transparencies and the nature of imprints thereon may vary depending upon the nature of the use to which such a booklet is put. Further, the printed material on the sheets may be in black-and-white line drawings, prints of black-and-white or color photographs, or the like, and the order of viewing may differ from that shown in the described embodiment.

What I claim is:

1. A teaching aid for use in coaching sports and like activities requiring coordination, in time and position, of various parts of the body, the said teaching aid comprising a plurality of transparencies illustrating incremental movements and a plurality of opaque sheets, said transparencies and sheets being assembled in a booklet form with one of said sheets separating each pair of adjacent transparencies, the said transparencies being arranged for sequential viewing from either side, whereby either left-handed or right-handed movements will be displayed.

2. The teaching aid of claim 1, wherein said opaque sheets are sheets of white material, each sheet of said material serving as a background for one of a pair of adjacent transparencies when viewing illustrations of left-handed movements, and serving as a background for the other of said pair of adjacent transparencies when viewing illustrations of right-handed movements, thereby eliminating interference from other transparencies.

3. The teaching aid of claim 2, wherein said plurality of transparencies and sheets are secured together along one edge whereby said transparencies may be flipped for rapid sequential viewing from either side.

4. The teaching aid of claim 3, wherein said transparencies are releasably secured by gripper means for easy replacement of transparencies.

5. The teaching aid of claim 3, wherein said transparencies comprise transparent plastic sheets, each carrying a reproduction depicting a different incremental portion of a movement to be taught.